(12) United States Patent
Moore

(10) Patent No.: US 9,208,603 B2
(45) Date of Patent: Dec. 8, 2015

(54) METHODS AND ASSOCIATED SYSTEMS FOR SIMULATING ILLUMINATION PATTERNS

(71) Applicant: Radiant Zemax, LLC, Redmond, WA (US)

(72) Inventor: Ken Moore, Bellevue, WA (US)

(73) Assignee: Zemax, LLC, Kirkland, WA (US)

( * ) Notice: Subject to any disclaimer, the term of this patent is extended or adjusted under 35 U.S.C. 154(b) by 231 days.

(21) Appl. No.: 13/797,469

(22) Filed: Mar. 12, 2013

(65) Prior Publication Data

US 2013/0293545 A1 Nov. 7, 2013

Related U.S. Application Data

(60) Provisional application No. 61/642,015, filed on May 3, 2012.

(51) Int. Cl.
*G06T 15/00* (2011.01)
*G06T 15/06* (2011.01)
*G06T 15/50* (2011.01)

(52) U.S. Cl.
CPC ............... *G06T 15/06* (2013.01); *G06T 15/50* (2013.01)

(58) Field of Classification Search
CPC .................................. G06T 15/50; G06T 15/06
USPC .................... 345/419, 426, 506, 582, 606
See application file for complete search history.

(56) References Cited

U.S. PATENT DOCUMENTS

| | | | | |
|---|---|---|---|---|
| 5,142,617 A | * | 8/1992 | Dalrymple et al. | 345/606 |
| 5,163,126 A | * | 11/1992 | Einkauf et al. | 345/423 |
| 5,253,339 A | * | 10/1993 | Wells et al. | 345/426 |
| 6,677,957 B2 | * | 1/2004 | Grzeszczuk et al. | 345/582 |
| 7,808,503 B2 | * | 10/2010 | Duluk et al. | 345/506 |
| 7,864,177 B2 | * | 1/2011 | Bunnell | 345/426 |

* cited by examiner

*Primary Examiner* — Phu K Nguyen
(74) *Attorney, Agent, or Firm* — Perkins Coie LLP

(57) ABSTRACT

Systems and methods for simulating illumination patterns on target surfaces in a space are disclosed. The system includes an input component and a simulation component. The input component receives a sampling angular range, a sampling polygon density, and a sampling polygon type. The simulation component traces sampling rays according to the sampling angular range and the sampling polygon density and type within a sampling range. The simulation component can further (1) generate an initial illumination pattern with a plurality of sampling polygon projections on the target surface; (2) assign the same value of an attribute in the sampling polygon projections defined by sampling rays through substantially the same route from the light source to the target surface; and (3) adjust the value of the attribute in the sampling polygon projection defined by sampling rays from different routes by interpolation.

20 Claims, 9 Drawing Sheets

METHODS AND ASSOCIATED SYSTEMS FOR SIMULATING ILLUMINATION PATTERNS

CROSS-REFERENCE TO RELATED APPLICATIONS

This application claims the benefit of and priority to U.S. Provisional Application No. 61/642,015, filed May 3, 2012, and incorporated herein by reference in its entirety.

TECHNICAL FIELD

The present technology relates generally to methods and systems for simulating illumination patterns in optical design systems.

BACKGROUND

Conventional illumination design systems typically require significant computing resources and time to properly compute lighting patterns on target surfaces or regions. FIG. 1, for example, is a screen shot of a user interface 10 illustrating a conventional technique for simulating illumination patterns. This technique includes projecting sampling rays from a light source point 101 toward a target surface 102. The sampling rays can be refracted, reflected, scattered, or diffracted by objects 103, 104, 105, and 106. As shown in FIG. 1, for example, the object 103 is a lens with an array of hexagons, the object 104 is a spheroid, the object 105 is a cylinder, and the object 106 is a cuboid. In order to simulate an illumination pattern of the light source 101 on the target surface 102, conventional simulation techniques typically require tracing a large number of sampling rays (e.g., five million sampling rays) to get an idea of the light pattern on the target surface 102. Such techniques can be inefficient, costly, and require significant computing resources and processing time.

Figure 1:
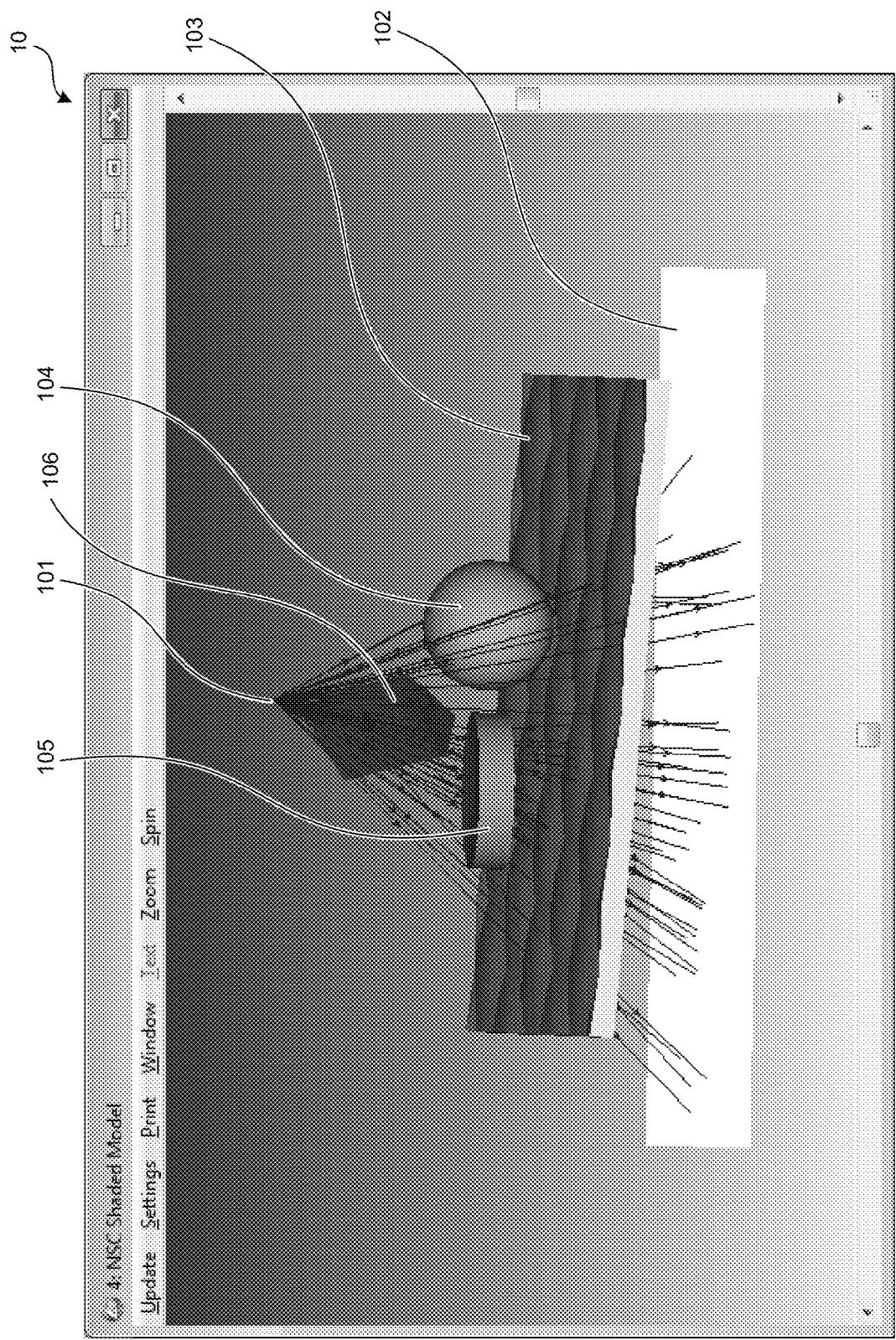
FIG. 1 is a screen shot of a user interface illustrating a conventional technique for simulating illumination patterns.

A portion of this disclosure contains material to which a claim for copyright is made. The copyright owner has no objection to the facsimile reproduction by anyone of the patent document or patent disclosure (including the Figures) as it appears in the U.S. Patent and Trademark Office patent file or records, but the copyright owner reserves all other copyright rights whatsoever.

DETAILED DESCRIPTION

The following disclosure is directed to methods and associated systems for simulating illumination patterns in optical design systems. As described in greater detail below, a method for simulating an illumination pattern on a target surface in a space in accordance with an embodiment of the present technology can include selecting a light source in the space, determining a sampling angle, a sampling range, and a sampling polygon type, and simulating a plurality of sampling rays according to the sampling angle and the sampling polygon type within the sampling range. This technique creates an initial illumination pattern with a plurality of sampling polygon projections on the target surface. The method also includes assigning the same value of an attribute in the sampling polygon projections defined by sampling rays through substantially the same route from the light source to the target surface, and adjusting the value of the attribute in the sampling polygon projection defined by sampling rays from different routes by interpolation according to a predetermined detail requirement so as to finalize the illumination pattern. The method further includes displaying the illumination pattern on a user interface.

One feature of the present technology is that instead of tracing a huge number of individual sampling rays, the disclosed interpolation schemes can be used to accurately and quickly estimate and model a selected number of sampling rays traveling to the target surface. More particularly, a light source typically emits sampling rays through an entire selected angular range. The traveling paths of neighboring sampling rays are usually very similar (i.e., neighboring sampling rays hit the same objects in the space and in the same order, and reach approximately the same position on the target surface, only with slightly different coordinates or reflective/refractive angles). Therefore, in contrast with conventional techniques that include simulating or tracing very large numbers (e.g., millions) of sampling rays, the present technology utilizes interpolation schemes to estimate how a small number of sampling rays travel to the target surface area, and using such data to approximate the appearance of lit scenes in optical design programs/systems. These techniques are expected to significantly reduce the required processing time without sacrificing the quality and/or accuracy of simulation results.

Certain details are set forth in the following description and in FIGS. 2A-7 to provide a thorough understanding of various embodiments of the disclosure. However, other details describing well-known structures and systems often associated with visual displays and related optical equipment and/or other aspects of visual display calibration systems are not set forth below to avoid unnecessarily obscuring the description of various embodiments of the disclosure.

Many of the details, dimensions, angles, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

A. Embodiments of Methods and Systems for Simulating Illumination Patterns

Figure 2A:
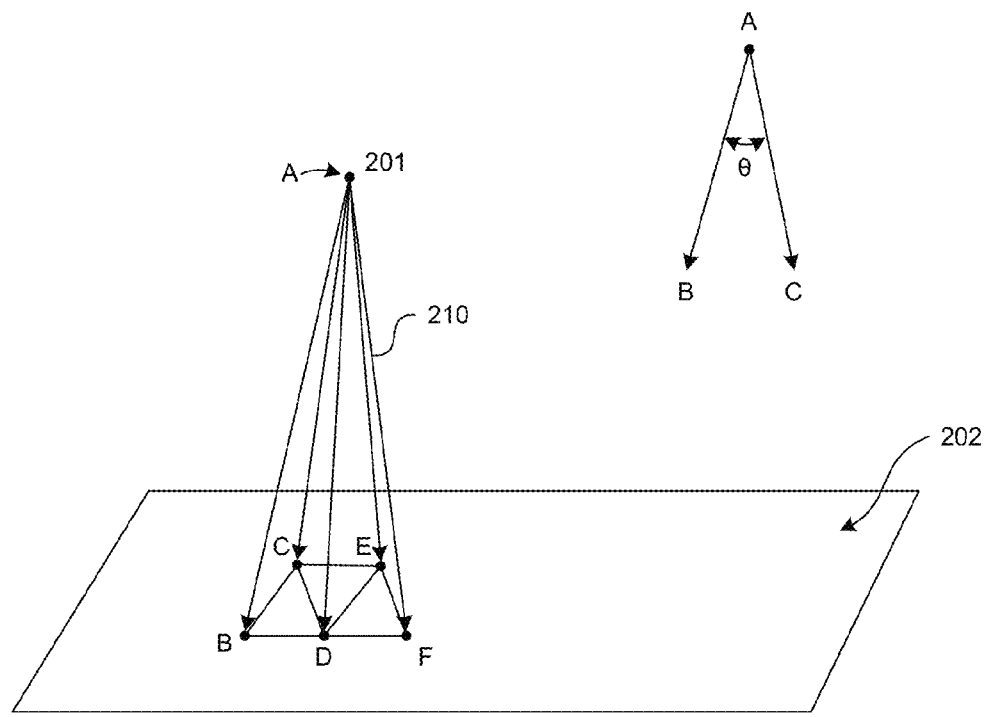
FIG. 2A is a schematic diagram of a sampling angle and sampling polygons configured in accordance with an embodiment of the present technology.

FIG. 2A is a schematic diagram of a sampling angle and sampling polygons configured in accordance with an embodiment of the present technology. In the illustrated embodiment, sampling rays 210 emanate from a light source point 201 (i.e., vertex A) toward a target surface 202. As described in greater detail below, a user can effectively simulate or model an illumination pattern on the target surface 202 using the disclosed technology in a fraction of the time it would take using conventional techniques. In this embodiment, for example, a user can first determine a sampling angle θ. As shown in FIG. 2A, the sampling angle θ can be defined by two sampling rays (e.g., AB and AC). Smaller sampling angles θ, for example, can result in more detailed simulation results. Second, a user can select an appropriate sampling polygon type. In other embodiments, the target surface 102 can include more than one surface. For example, the target surface 102 can include a first surface and a second surface substantially perpendicular to the second surface (e.g. two adjacent surfaces at a corner of a room).

In the embodiment shown in FIG. 2A, for example, the sampling polygon with a triangular cross section (i.e., three sampling rays constitute this kind of polygon; referred as "N=3" type). In other embodiments, however, the sampling polygon can be defined by any number of sampling rays. In the illustrated embodiment, three sampling polygons are shown: polygons ABCD, ACDE, and ADEF. These polygons are 3-sided polygons (plus one bottom surface, for four surfaces in total). In accordance with an embodiment of the present technology, if the sampling rays that define the polygon have substantially the same traveling path, then the polygon can represent a uniform value of an attribute, such as radiant energy, ray position, ray angle, transmission, or color of the ray. Based on this concept, simulation of illumination patterns in accordance with the present technology uses a relatively small number of sampling rays to create an illumination pattern without significantly sacrificing accuracy and/or quality. In polygon ABCD, for example, the constituent sampling rays (i.e., AB, AC, AD) all have substantially the same traveling path, so all rays within the polygon ABCD can be considered as having the same value of an attribute (i.e., uniform). Thus, these three sampling rays (i.e., AB, AC, and AD) can be representative to all rays within the polygon ABCD. In this embodiment, polygons ACDE and ADEF have the same configuration. In other embodiments, however, polygons ACDE and ADEF may have a different arrangement.

In the embodiment shown in FIG. 2A, five sampling rays (i.e., AB, AC, AD, AE, AF) are simulated to create the illumination pattern of the target area (i.e., area BCEF, including three triangles BCD, CDE, and DEF) on the target surface 202. In some embodiments, one simulation for a vertex (e.g., vertices C, D, and E) is sufficient. In other embodiments, however, a different number of sampling rays may be used. As noted above, one feature of the present technology is that the disclosed techniques are expected to significantly reduce the computing burden of sampling ray simulation.

Figure 2B:
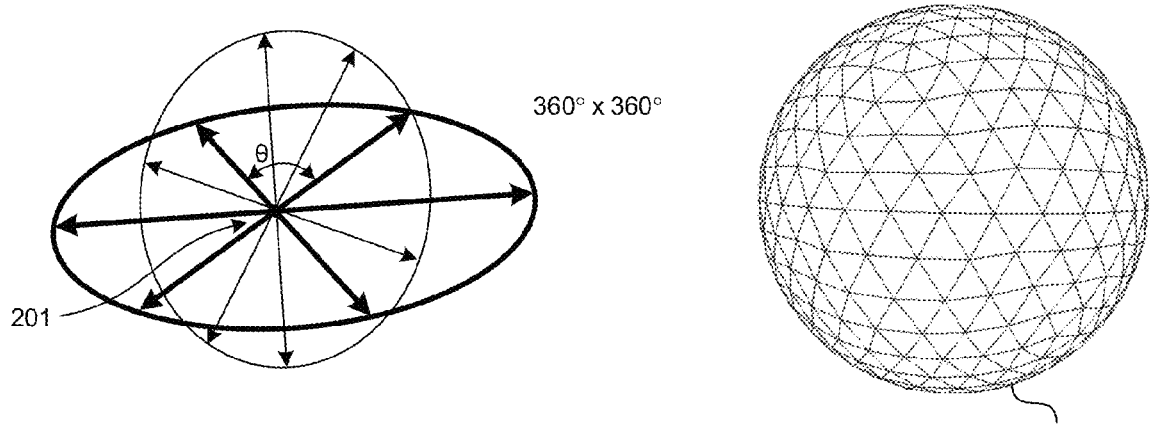
FIG. 2B is a schematic diagram showing a sampling range in accordance with an embodiment of the present technology.

FIG. 2B is a schematic diagram showing a sampling range in accordance with another embodiment of the present technology. The light source point 201 can emanate sampling rays 210 outwardly through a selected angular range (e.g., three dimensions; 360°×360°) by any predetermined sampling angle θ. In the illustrated embodiment, for example, the sampling range can be a hemisphere. In some embodiments, the sampling range can be subdivided into a plurality of polygons, and then the illumination pattern on a target surface can be generated accordingly. For example, as shown in FIG. 2B, in some embodiments the sampling range can be a sphere 220 with an initial set of polygons. In other embodiments, however, the sampling range may have a different arrangement.

Figure 2C:
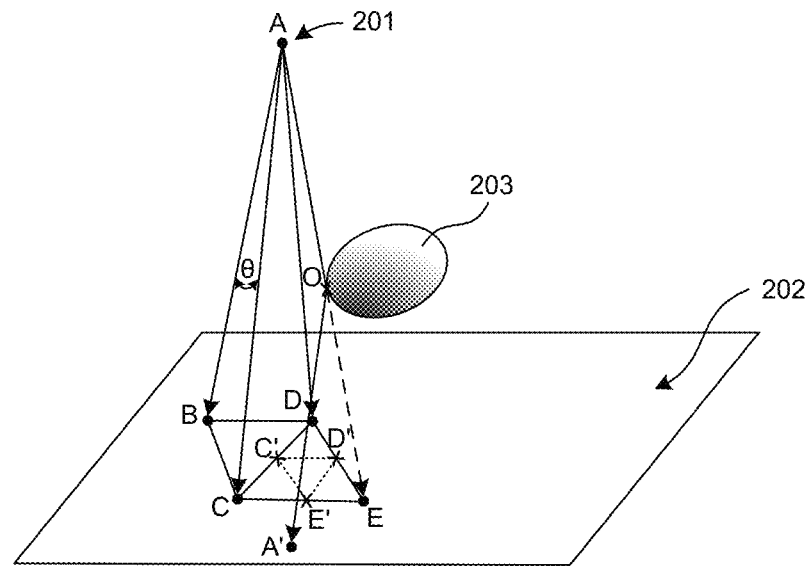
FIG. 2C is a schematic diagram illustrating an interpolation technique configured in accordance with an embodiment of the present technology.

FIG. 2C is a schematic diagram illustrating an interpolation technique or process in accordance with an embodiment of the present technology. For embodiments in which the sampling rays constituting a polygon do not have substantially similar traveling paths, further interpolation may be used to simulate the illumination pattern more accurately. For example, as shown in FIG. 2C, sampling rays (AB, AC, AD) constituting the polygon ABCD all have a substantially similar traveling path and, accordingly, there is no need for further interpolation (i.e., a value of an attribute in this polygon is uniform or generally uniform). In contrast, the sampling rays (AE, AC, AD) constituting polygon AECD do not all have a substantially similar traveling path. For example, the sampling ray AE hits an object 203, and its traveling path is then reflected as OA' after the hitting vertex O. Thus, the polygon AECD can be interpolated further.

In one embodiment, for example, the polygon AECD can be interpolated using a bisecting scheme. As shown in FIG. 2C, three additional vertices C', D', and E' can be created at the middle of the lines CD, DE, and CE, respectively. Three additional sampling rays (i.e., AC', AD' and AE') can be traced from the light source point 201, and four additional sampling polygons can be generated: AEE'D', AC'D'E', ACC'E', and AC'DD'. In this way, the accuracy of the simulation results may be enhanced by having more detailed sampling polygons.

Figure 2D:
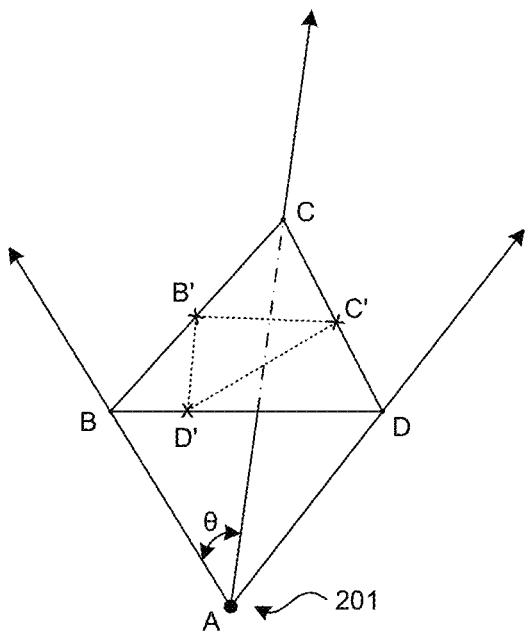
FIGS. 2D and 2E are schematic diagrams illustrating techniques for generating additional sampling polygons in accordance with embodiments of the present technology.
Figure 2E:
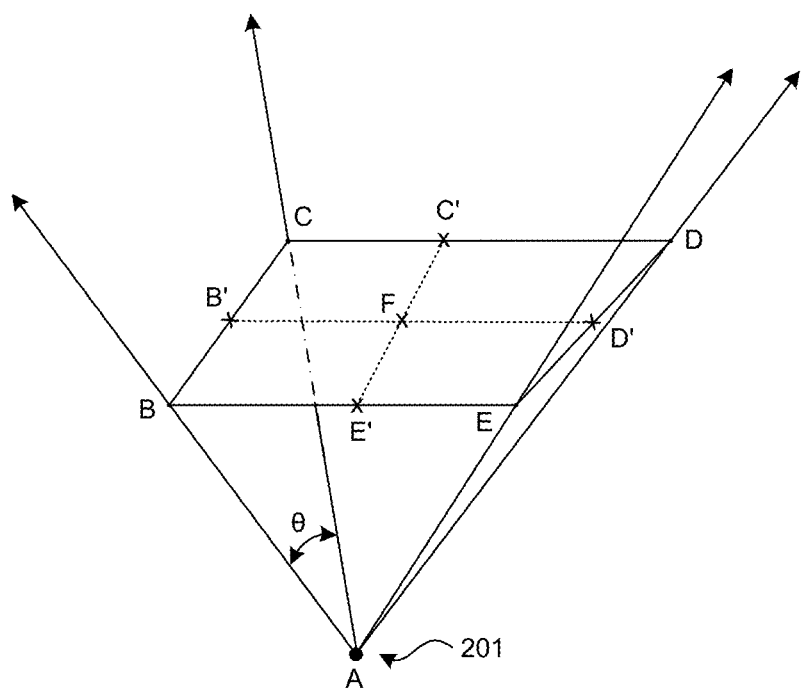

The bisecting scheme described above is not the only method to generate more detailed polygons from the light source point 201. FIGS. 2D and 2E, for example, are schematic diagrams illustrating techniques for generating additional sampling polygons in accordance with further embodiments of the present technology. Referring first to FIG. 2D, new vertices B', C' and D' can be added at any position of the lines BC, CD and BD, respectively, of the original polygon ABCD. More detailed sampling polygons can then be generated as part of the calculation process as discussed above.

Referring next to FIG. 2E, the original polygon ABCED may be defined by four sampling rays (AB, AC, AD, and AE; referred as "N=4" type). Additional vertices B', C', D' E' and, F can be added in the original polygon ABCDE, and additional five sampling rays (AB', AC', AD', AE' and AF) can be traced. Additional vertices B', C', D' and E' can be added at any position of the lines BC, CD, DE, and BE, respectively. In additional embodiments, further additional sampling polygons having a variety of suitable arrangements may be used.

Figure 3:
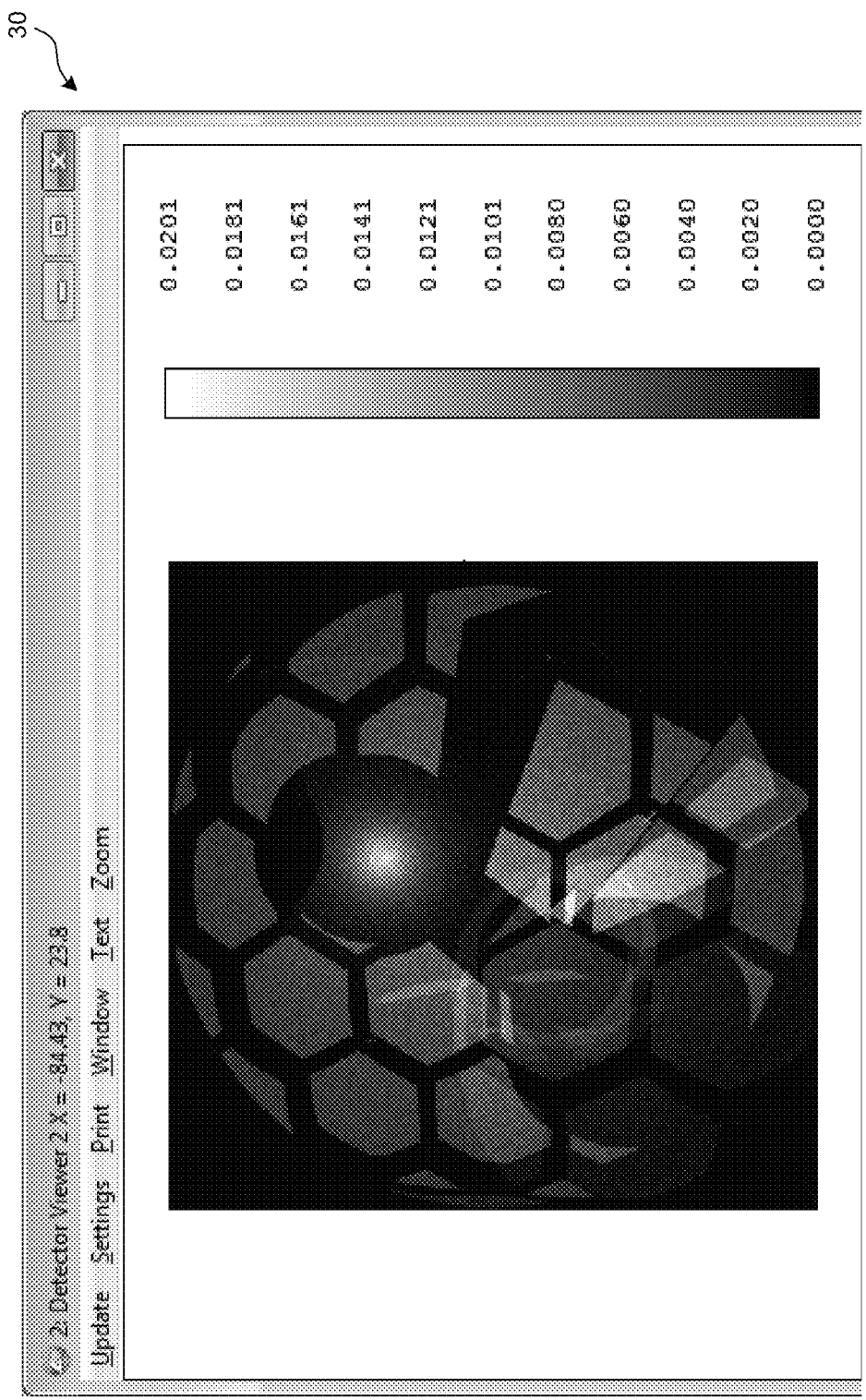
FIGS. 3-5 are screen shots illustrating simulation results in accordance with embodiments of present technology.
Figure 4:
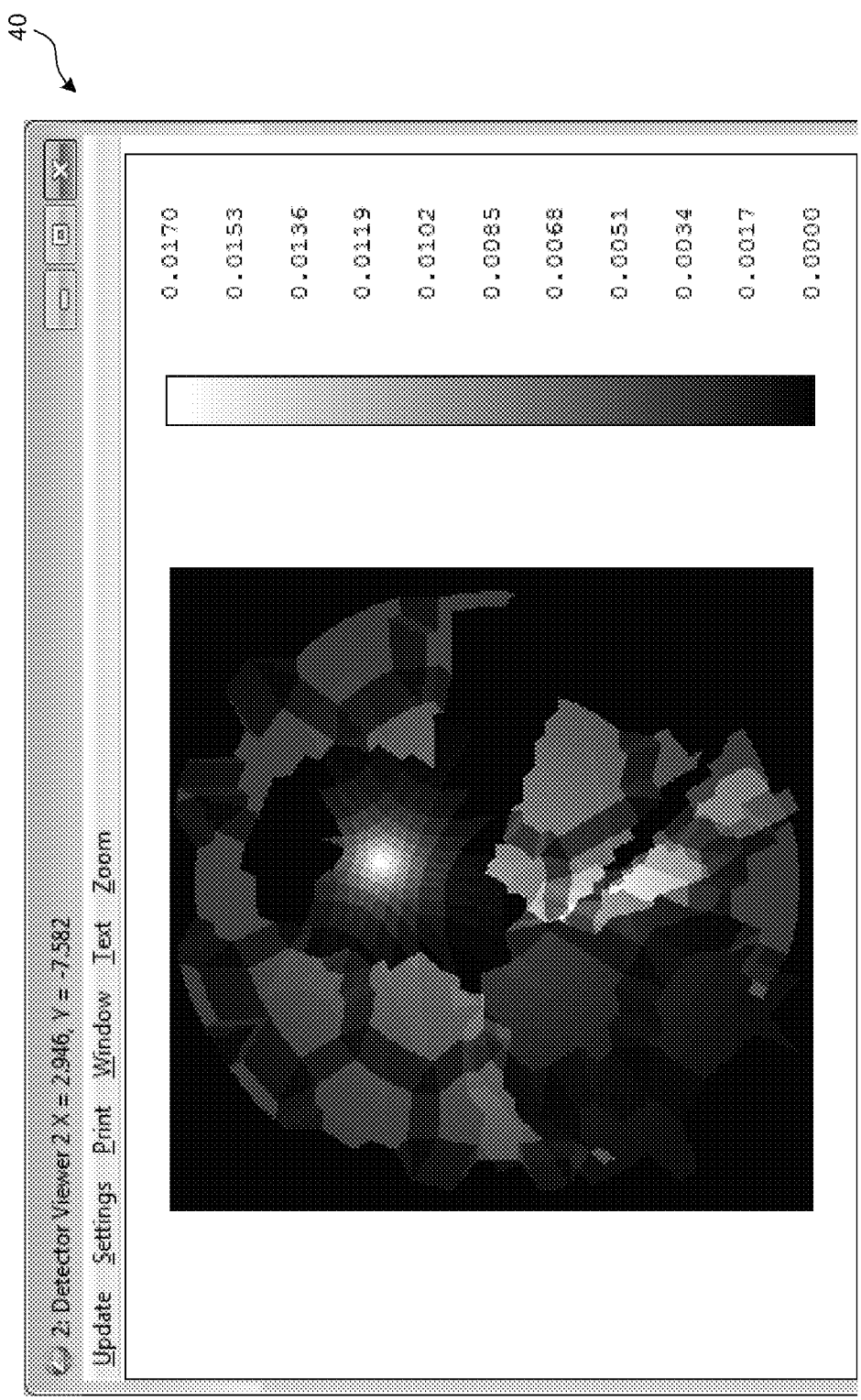
Figure 5:
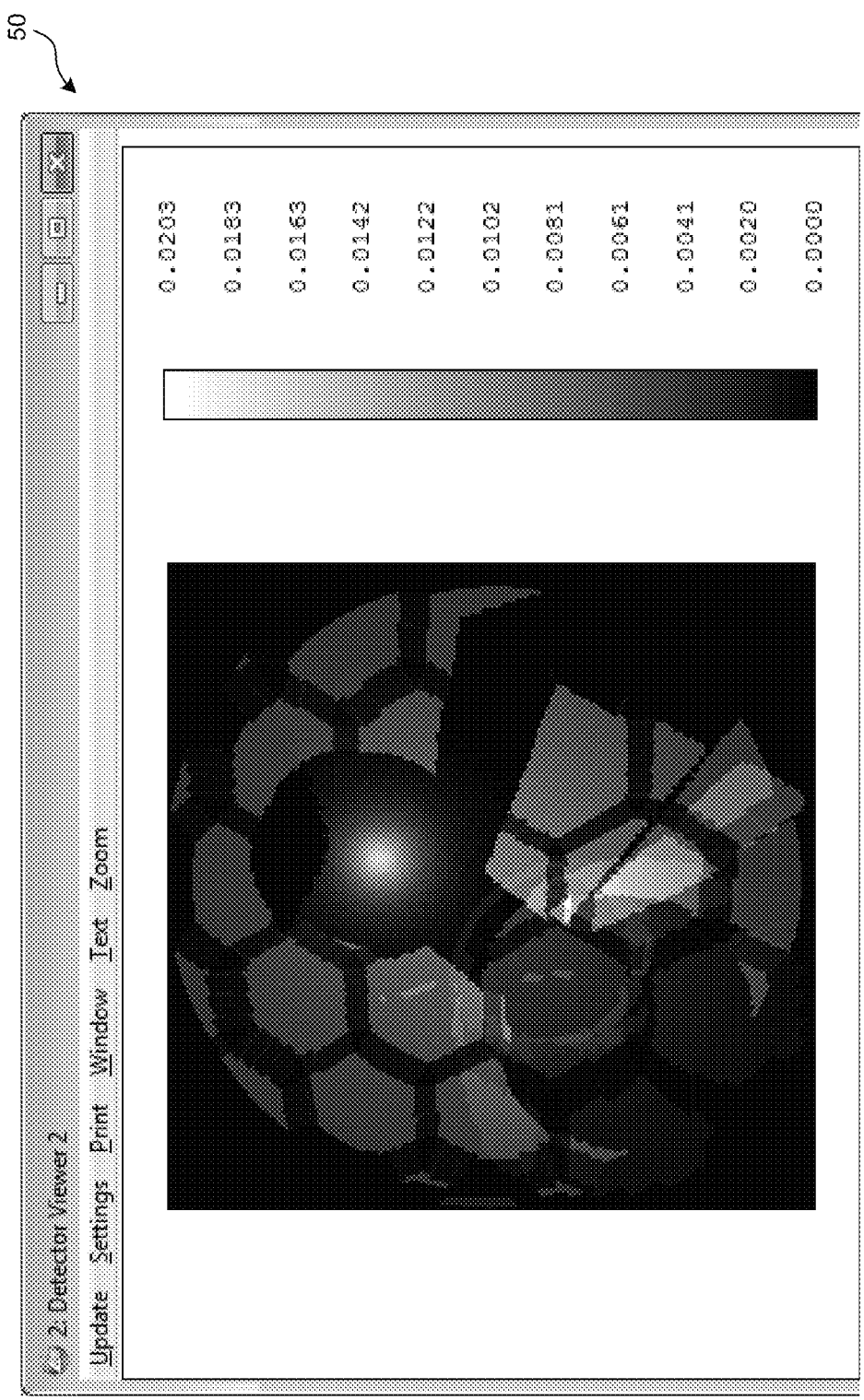

FIGS. 3-5 are screen shots illustrating simulation results in accordance with embodiments of the present technology. More specifically, FIGS. 3-5 illustrate user interfaces 30, 40 and 50, respectively, including different simulation results of an illumination pattern on the target surface 102 from the light source point 101 (see FIG. 1; with the same objects 103, 104, 105, and 106) using simulation methods and process in accordance with the present technology. In these embodiments, the sampling polygon type is a triangle ("N=3" type; defined by 3 sampling rays). The hexagonal shapes shown in FIGS. 3-5 are caused by an object (e.g., a lens with an array of hexagons). The user interface 30 in FIG. 3 shows a "coarse" sampling, the user interface 40 in FIG. 4 shows a "medium" sampling, and the user interface 50 in FIG. 5 shows a "fine" sampling. The users can adjust the sampling level by choosing how detailed their sampling polygons would be (see, for example, the FIGS. 2C-2E and the corresponding description above).

In various embodiments, the "medium" sampling can have a sampling polygon number twice than the sampling polygon number used in the "coarse" sampling. For example, the "coarse sampling" can create 500 sampling polygons on a target surface, and then the "medium" sampling can create 1000 sampling polygons on the target surface. Similarly, in various embodiments, the "fine" sampling can have a sampling polygon number twice than the sampling polygon number used in the "medium" sampling. For example, the "medium sampling" can create 1000 sampling polygons on a target surface, and then the "fine" sampling can create 2000 sampling polygons on the target surface. In other embodiments, the "coarse," "medium," and/or "fine" sampling may include different sampling numbers and/or different ratios relative to each other.

In certain embodiments, for example, the user can choose to skip the subdivision simulation (e.g., the bisecting scheme discussed above) for a "coarse" sampling, such as shown in FIG. 3. In other embodiments, the user can choose to conduct the subdivision simulation once for a "medium" sampling, such as shown in FIG. 4. In still further embodiments, the user can choose to do the subdivision simulation twice for a "fine" sampling, as shown in FIG. 5. In some embodiments, a user can determine how many times of subdivision simulation can be conduced. In other embodiments, the user can determine to repeat the subdivision simulation cycle until certain predetermined criterion has been met.

In certain embodiments, the user can opt to directly run the "fine" or "medium" sampling simulation in a specific direction. For example, certain types of anisotropic (e.g., directional) light sources, such as flashlights, projection lamps, or certain Light-Emitting Diode (LED) products, can have different light strength per unit area (such as, luminance, $cd/m^2$) along different directions. For these types of directional light sources, it can significantly reduce the simulation or processing time by focusing the simulation on a specific light direction. In certain embodiments, to improve simulation efficiency, the user can conduct a pre-sampling simulation in certain directions in cases where directional light sources are involved.

In other embodiments, more than one light source can be selected and simulated. In still further embodiments, the light source is not limited to point light sources. Line light sources, plane light sources, and/or 3-dimension light sources can also be selected and simulated in accordance with the present technology.

Figure 6:
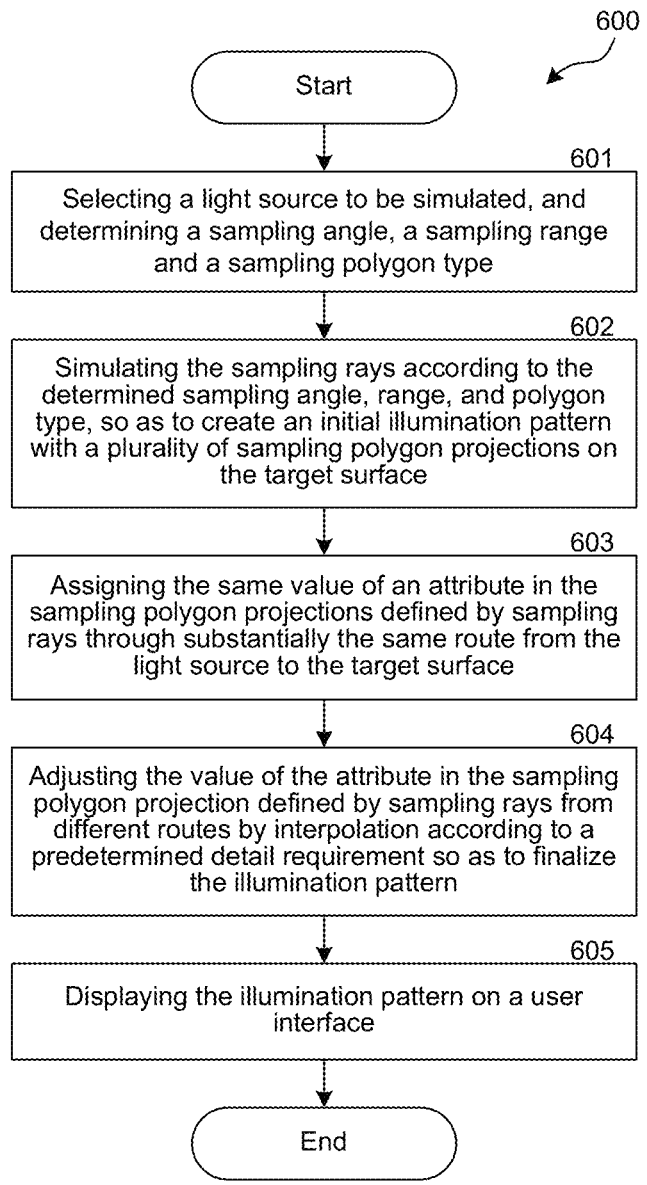
FIG. 6 is a flowchart illustrating various stages of a method or process for simulating an illumination pattern on a target surface in accordance with an embodiment of the present technology.

FIG. 6 is a flowchart illustrating various stages of a method or process 600 for simulating an illumination pattern on a target surface in accordance with an embodiment of the present technology. At stage 601, the method 600 includes selecting a light source (such as the light source point 201) to be simulated, and determining a sampling angle (e.g., sampling angle θ in FIGS. 2A-2E), a sampling range (e.g., a hemisphere), and a sampling polygon type (e.g., N=3 type, N=4 type, or N=6 type, as mentioned above).

At stage 602, the method 600 includes simulating the sampling rays according to the determined sampling angle, range, and polygon type, so as to create an initial illumination pattern with a plurality of sampling polygon projections on the target surface.

At stage 603, the method 600 includes assigning the same value of an attribute (e.g., radiant energy, ray position, ray angle, transmission, or color of the ray) in the sampling polygon projections (e.g., the area BCD on the target surface 202 in FIG. 2C) defined by sampling rays through substantially the same route (e.g., the polygon ABCD described in FIG. 2C) from the light source to the target surface.

At stage 604, the method 600 includes adjusting the value of the attribute in the sampling polygon projection (e.g., the area CDE on the target surface 202 in FIG. 2C) defined by sampling rays from different routes (e.g., the polygon ACDE described in FIG. 2C) by interpolation (e.g., by methods described in FIG. 2D or 2E) according to a predetermined detail requirement (e.g., FIGS. 3-5) so as to finalize the illumination pattern.

At stage 605, the method 600 includes displaying the illumination pattern on a user interface (e.g., the user interfaces 30, 40, and 50). In other embodiments, the method 600 can include different steps or the steps can include a different arrangement. The method 600 can be performed by any suitable computing systems under different type of operating systems, such as Microsoft Windows or Mac OS.

Figure 7:
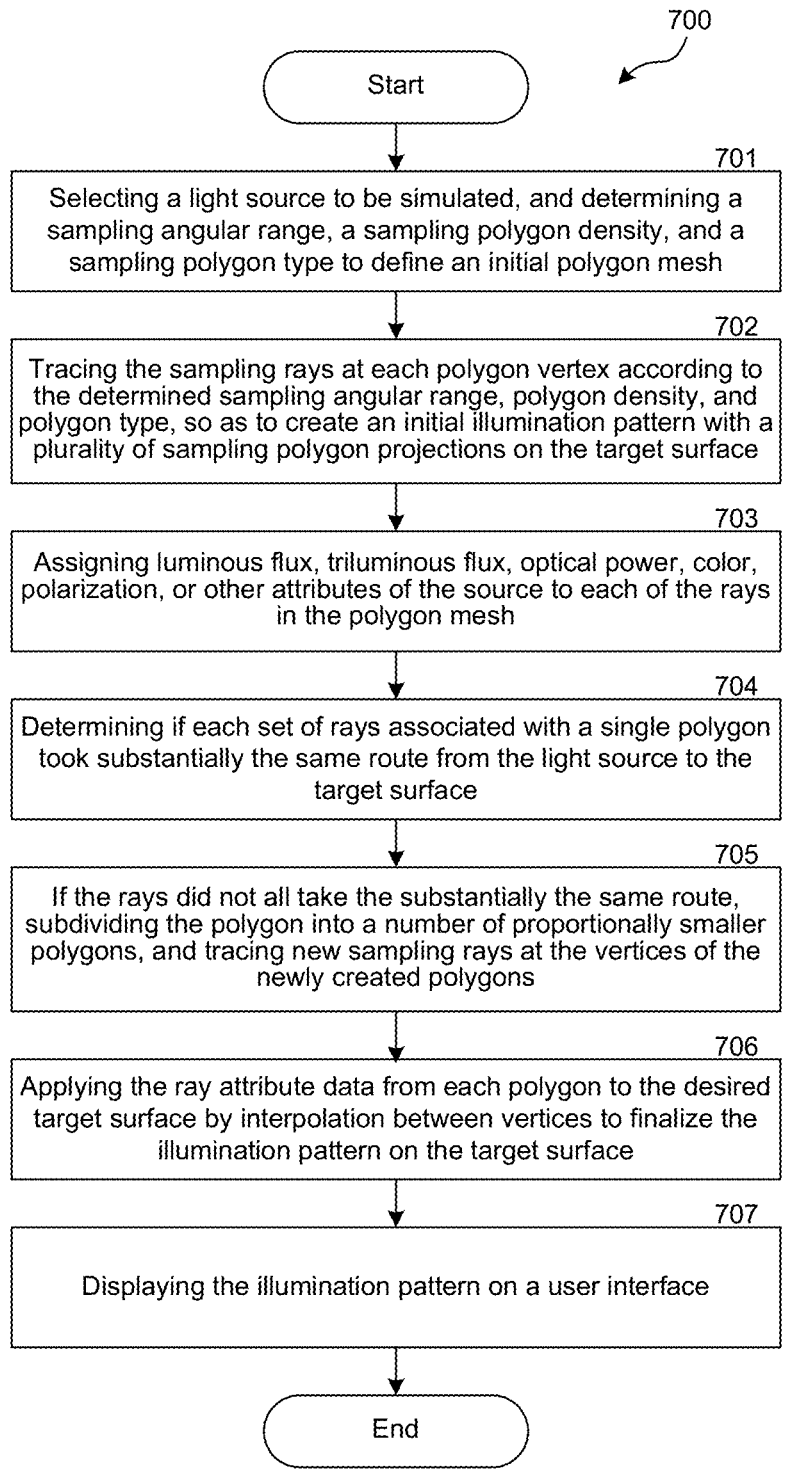
FIG. 7 is a flowchart illustrating various stages of another method or process for simulating an illumination pattern on a target surface in accordance with another embodiment of the present technology.

FIG. 7 is a flowchart illustrating various stages of another method or process 700 for simulating an illumination pattern on a target surface in accordance with another embodiment of the present technology. At stage 701, the method 700 includes selecting a light source (such as the light source point 201) to be simulated, and determining a sampling angular range (e.g., θ in FIGS. 2A-2E), an initial sampling polygon density (e.g., the number of expected polygon sampling projections on the target surface; the actual sampling polygon density is subject to change based on further interpolation as discussed below), and a sampling polygon type (e.g., N=3 type, N=4 type, or N=6 type, as mentioned above) to define an initial polygon mesh (e.g., a set of initial polygon "frames" projected on the target surface, such as the pattern shown on the target surface 202 in FIG. 2C).

At stage 702, the method 700 includes tracing the sampling rays at each polygon vertex according to the determined sampling angular range, initial polygon density, and polygon type, and creating an initial illumination pattern with a plurality of sampling polygon projections on the target surface.

At stage 703, the method 700 includes assigning luminous flux, triluminous flux, optical power, color, polarization, or other attributes of the source to each of the rays in the polygon mesh. At stage 704, the method 700 continues by determining if each set of rays associated with a single polygon took substantially the same route from the light source to the target surface.

If the rays did not all take the substantially the same route, at stage 705 the method 700 includes subdividing the polygon into a number of proportionally smaller polygons, and tracing new sampling rays at the vertices of the newly created polygons. In certain embodiments, stage 705 may be repeated until any desired accuracy is achieved. In other embodiments, the accuracy may be defined either by the number of subdivision cycles or by certain predetermined criterion, such as importance of an attribute in the polygon being subdivided.

At stage 706, the method 700 includes applying the ray attribute data from each polygon to the desired target surface by interpolation between vertices to finalize the illumination pattern on the target surface. The method 700 continues at stage 707 with displaying the illumination pattern on a user interface. In other embodiments, the method 700 can include different steps or the steps can include a different arrangement. The method 700 can be performed by any suitable computing systems under different type of operating systems, such as Microsoft Windows or Mac OS. In certain embodiments, the method 700 can further include storing received and generated information in a storage device. Examples of the received information can include initial conditions, such as the received sampling angular range, the received initial sampling polygon density, and the received sampling polygon type. An example of the generated information is the generated illumination pattern. In other embodiments, the method 700 can further include transmitting the received and generated information via a network (e.g., via the Internet).

The computing systems or devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the system. In addition, the data structures and message structures may be stored or transmitted via a data transmission medium, such as a signal on a communications link. Various communications links may be used, such as the Internet, a local area network, a wide area network, or a point-to-point dial-up connection.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the disclosure uses the word "or" in reference to a list of two or more items, that word covers all of the following interpretations of the word: any of the items in the list, all of the items in the list and any combination of the items in the list.

The detailed descriptions of embodiments of the technology are not intended to be exhaustive or to limit the invention to the precise form disclosed above. While specific embodiments of, and examples for, the technology are described for illustrative purposes, various equivalent modifications are possible within the scope of the technology, as those skilled in the relevant art will recognize. For example, while steps are presented in a given order, alternative embodiments may perform routines having steps in a different order. Further, the elements and acts of the various embodiments described herein can be combined to provide further embodiments. Moreover, the teachings of the technology provided herein can be applied to other systems, not necessarily the system described herein.

These and other changes can be made to the technology in light of the detailed description. In general, the terms used in the following disclosure should not be construed to limit the technology to the specific embodiments disclosed in the specification, unless the above detailed description explicitly defines such terms. Accordingly, the actual scope of the technology encompasses the disclosed embodiments and all equivalent ways of practicing or implementing the technology.

I claim:

1. A method for simulating an illumination pattern on a target surface in a space, the method comprising:
    selecting a light source in the space;
    determining a sampling angular range, an initial sampling polygon density, and a sampling polygon type;
    tracing a plurality of sampling rays according to the sampling angular range, the initial sampling polygon density, and sampling polygon type within the sampling angular range, so as to create an initial illumination pattern with a plurality of sampling polygon projections on the target surface, wherein each of the sampling polygon projections is associated with a corresponding portion of the sampling rays that travels from the light source to each of the sampling polygon projections;
    assigning a value of a light attribute to each of the sampling polygon projections;
    adjusting the value of the light attribute in at least one of the sampling polygon projections by interpolation in response to an event that one of the sampling rays hits an object in the space so as to finalize the illumination pattern; and
    displaying the illumination pattern on a user interface.

2. The method of claim 1, wherein the light source has a significant light strength per unit area in a predetermined direction, and wherein the method further comprises tracing a plurality of pre-sampling rays in the predetermined direction before determining the sampling angular range, the initial sampling polygon density, and the sampling polygon type.

3. The method of claim 1 wherein the sampling range comprises a hemisphere.

4. The method of claim 1 wherein the interpolation is based on a bisecting scheme.

5. The method of claim 1 wherein the sampling polygon type comprises a 3-sided polygon, a 4-sided polygon, and/or a 6-sided polygon.

6. The method of claim 1 wherein the light attribute comprises luminous flux, triluminous flux, optical power, color, and/or polarization.

7. The method of claim 1 wherein the target surface comprises a first area with a first sampling polygon density and a second area with a second sampling polygon density, and wherein the first sampling polygon density is greater than the second sampling polygon density.

8. A method for simulating an illumination pattern on a target surface in a space, the method comprising:
    selecting a light source in the space;
    determining a sampling angular range, an initial sampling polygon density, and a sampling polygon type to define a polygon mesh;
    tracing a plurality of sampling rays corresponding to vertices of the polygon mesh and creating an initial illumination pattern on the target surface,
    wherein the initial illumination pattern includes a plurality of sampling polygons projections, and wherein each of the sampling polygon projections is associated with a corresponding portion of the sampling rays that travels from the light source to each of the sampling polygon projections;
    assigning a value of light attributes of the light source to each of the sampling polygon projection;
    determining sampling polygons projections to be subdivided in response to an event that one of the sampling rays hits an object in the space;
    selectively tracing additional sampling rays corresponding to the vertices of the sampling polygons projections to be subdivided;
    adjusting the value of the light attributes in at least one of the sampling polygon projections to be subdivided to finalize the illumination pattern on the target surface; and
    displaying the illumination pattern on a user interface.

9. The method of claim 8, further comprising selecting a pre-sampling direction based on a light strength per unit area of the light source.

10. The method of claim 9 wherein the polygon mesh comprises a third number of sampling polygons on the target surface during a fine sampling, and wherein the third number is greater than the second number.

11. The method of claim 8 wherein the polygon mesh comprises a first number of sampling polygons on the target surface during a coarse sampling, and wherein the polygon mesh comprises a second number of sampling polygons on the target surface during a medium sampling, and further wherein the second number is greater than the first number.

12. The method of claim 8 wherein the polygon mesh comprises a plurality of triangular projections on the target surface.

13. The method of claim 8 wherein the light source further comprises a first light source and a second light source, and wherein the first light source has a greater light strength per unit area than the second light source.

14. The method of claim 8 wherein the target surface further comprises a first surface and a second surface, and wherein the first surface is substantially perpendicular to the second surface.

15. A system for simulating an illumination pattern from a light source on a target surface in a space, the system comprising:
    an input component configured to receive a sampling angular range, an initial sampling polygon density, and a sampling polygon type; and
    a simulation component configured to trace a plurality of sampling rays according to the sampling angular range, the initial sampling polygon density, and the sampling polygon type within the sampling angular range,
        wherein the simulation component is further configured to generate an initial illumination pattern with a plurality of sampling polygon projections on the target surface, and
        wherein each of the sampling polygon projections is associated with a corresponding portion of sampling rays that travels from the light source to each of the sampling polygon projections;
        wherein the simulation component is further configured to assign a value of a light attribute to each of the sampling polygon projections; and
        wherein the simulation component is further configured to adjust the value of the light attribute in the sampling polygon projections by interpolation in response to an event that one of the sampling rays hits an object in the space to finalize the illumination pattern for display on a user interface.

16. The system of claim 15 wherein the simulation component is further configured to:
    determine sampling polygons to be subdivided based upon determination of the route of rays taken; and
    selectively trace additional sampling rays corresponding to the vertices of the subdivided sampling polygons.

17. The system of claim 15 wherein the light source has a significant light strength per unit area in a predetermined direction, and wherein the simulation component is configured to trace a plurality of pre-sampling rays in the predetermined direction.

18. The system of claim 15 wherein the sampling angular range comprises a hemisphere.

19. The system of claim 15, further comprising:
    a first storage component configured to store the received sampling angular range, the received initial sampling polygon density, the received sampling polygon type and/or the illumination pattern; and
    a transmitting component configured to transmit the received sampling angular range, the received initial sampling polygon density, the received sampling polygon type and/or the illumination pattern to a second storage component through a network.

20. The system of claim 15 wherein the initial illumination pattern is generated in accordance with the objects in the space.

* * * * *

UNITED STATES PATENT AND TRADEMARK OFFICE
CERTIFICATE OF CORRECTION

PATENT NO. : 9,208,603 B2  
APPLICATION NO. : 13/797469  
DATED : December 8, 2015  
INVENTOR(S) : Ken Moore Page 1 of 1

It is certified that error appears in the above-identified patent and that said Letters Patent is hereby corrected as shown below:

In The Claims

In column 8, line 52, in claim 8, delete "polygons" and insert -- polygon --, therefor.

In column 10, line 20, in claim 17, delete "ofpre-sampling" and insert -- of pre-sampling --, therefor.

In column 10, line 35, in claim 20, delete "objects" and insert -- object --, therefor.

Signed and Sealed this  
Tenth Day of May, 2016

Michelle K. Lee  
*Director of the United States Patent and Trademark Office*